Patented Apr. 14, 1942

2,279,771

UNITED STATES PATENT OFFICE 2,279,771

COATING PROCESS

Paul Rolland Austin, Wilmington, Del., assignor to E. I. du Pont de Nemours & Company, Wilmington, Del., a corporation of Delaware No Drawing. Application April 19, 1940, Serial No. 330,615

6 Claims. (Cl. 91—70)

This invention relates to a new process for the application to objects, especially such as have more or less curvilinear cross-sectional perimeters, of coatings comprising organic material. More particularly, this invention relates to a new process for the application to substantially spherical or cylindrical objects, especially wire-shaped objects, of coatings comprising synthetic fusible polymers of those types which are capable of being formed into pliable fibers. A class of such polymers which is uniquely useful in the practice of this invention is that known as synthetic linear superpolyamides (hereinafter sometimes referred to merely as polyamides or polymeric amides) and is described, for example, in U. S. Patents 2,071,250, 2,071,253, 2,130,523 and 2,130,948. These polyamides generally have average molecular weights of not less than 10,000.

Many methods are known for the application of organic coating compositions. They commonly are applied from solution by brushing, dipping, or spraying. Many synthetic polymers, particularly the synthetic linear polyamides, are so insoluble, however, except in toxic, corrosive liquids such as phenol, cresol, and formic acid, that they cannot with both convenience and safety be applied from solution. It is true that solvents such as furfuryl alcohol, benzyl alcohol, ethylene glycol and formamide dissolve the synthetic linear polyamides at high temperatures, but since these polymers are degraded rapidly by the said liquids at the temperatures required to keep them in solution, solutions of the polyamides in them cannot well be used for solution coating.

In applying insulation coatings to electrical conductors, a field which presently is regarded as perhaps the most important for the use of this invention, a number of specific difficulties have occasioned a great deal of trouble in the past. For instance, when it has been attempted to supply pre-melted coating material to the wire, in order to form a solidified coating by subsequent cooling, it has proved difficult to achieve satisfactory centering. This problem has been found to become increasingly formidable, too, where it has been attempted to produce especially thin coatings, as, for example, in the coating of small wire for use where space considerations require that the coating be very thin. Moreover, where it has been attempted to apply solutions of the higher-melting superpolyamides to the wire, such superpolyamides being generally the most suitable for wire insulation, in order to form a solidified coating by evaporation of the solvent, it has been necessary to employ solvents which are toxic, corrosive, costly, or, by reason of their fumes or otherwise, dangerous to the health of the workmen. In addition, where thermosetting polymeric materials have been employed, requiring solvents of relatively high surface tension, it has been necessary to conduct the solvent evaporation at relatively low temperatures, with consequent increase in expenditure of time, in order to prevent premature increase of viscosity, as by reason of heat-hardening of the said materials. And with conventional plastics, which soften but do not melt sharply on heating, a similar difficulty has been encountered, by reason of the inherently high viscosity of the plastics. In short, the problem of providing a coating material with suitable flow characteristics, and of providing sufficient opportunity for the material to flow and thus tend to distribute itself uniformly about the wire, has been extremely acute and extremely formidable.

Over and above difficulties such as the foregoing, however, the art also has long been in need of an insulation which not only coats the wire but actually forms a shrunken, tight-fitting film of great inherent tenacity, about the wire. Such a film grips the wire with increased force, and consequently is far more adherent, tear-proof, and abrasion-resistant than a coating, which, independently of the wire, would have very little tenacity.

This invention has as an object, therefore, the production upon objects, especially such objects as have curvilinear cross-sectional perimeters that are endless, i. e., free from extremities such as are presented at sharp angles or sharp points, and are typified by ordinary electrical conductors, of coatings which not only excel in the general qualities desired by the trade, but which also are capable of being supplied in molten form, have unusually high flowability when so supplied, the surface-tensional forces inherent in them being such as to distribute them uniformly and quickly about the object, especially if it is wire-shaped or spherical, have an unusually high coefficient of contraction on solidification, and when so solidified form a covering which, independently of the supporting substratum (which advantageously has a non-jagged surface) has a high degree of tensile strength and tenacity.

Other objects will appear hereinafter.

These objects may be accomplished, and the hereinabove stated difficulties avoided, in accordance with the invention, by applying to a wire, for example, dispersions of finely divided particles comprising one or more of the hereinabove referred to fusible synthetic polymers, removing the dispersing medium or most of it, by evaporation, fusing the said synthetic polymers, and then solidifying them by cooling.

In applying the dispersions, which may be prepared, for instance, in accordance with the procedure set forth in application Serial Number 301,068, filed on October 24, 1939, a simple dip procedure may be used, in which the wire or other object passes upward from the surface of the dispersion and all the dispersion which adheres to it is allowed to pass into the oven. In another method, a wiping die having an opening somewhat larger than the wire is used to remove the excess dispersion and to smooth the coating before it passes into the oven. The latter method permits the use of more viscous dispersions. A plurality of coatings usually are applied, preferably in one operation, by passing the wire several times through the dispersion and oven before spooling. Other methods for applying the dispersion, such as spraying, also may be used.

It often is advisable to quench the coating by suddenly cooling it as the wire passes from the oven. The quenching may be effected, for instance, with water, air, or by contact with cold metals. The quenched coatings usually are tougher than those which cool slowly.

In the following examples, wherein the invention is illustrated in greater detail, purely conventional wire-enamelling apparatus is employed, which apparatus requires no drawings to be readily understood by those skilled in the art.

Example I

A sample of #18 soft copper wire is coated with an aqueous dispersion containing 9 per cent of finely divided solid polyhexamethylene adipamide particles which vary in size from 1 to 4 microns. The wire is passed through a small hole in the bottom of the pan containing the dispersion, upward through the dispersion, and then through a vertical oven 12' in length which is heated to 280° C. The wire, traveling at the rate of 13'/min., picks up an even coating of the dispersion in the pan and then, as the wire passes into the oven, the water is evaporated. On passing higher in the oven, the polymer melts and flows sufficiently upon the wire so that a continuous film of superpolyamide is formed around the wire. This superpolyamide coating solidifies as the wire emerges from the oven. The wire passes over pulleys which convey it back to the dispersion pan, where a second coat is applied. When six coats have been applied in this way, the coating is 1.2–1.3 mils (per side) in thickness. This coating contains not more than seven small pinholes per 100 ft. and withstands the abrasion of 130 strokes over a sharp edge, as compared with 2 for a sample of conventionl enameled wire.

Example II

When six steel ball wiping dies with 0.0500" orifices are used in conjunction with the equipment of Example I for applying the same dispersion, a smooth coating 0.6–0.7 mil (per side) is obtained. Upon repeated flexing the wire breaks before the polyamide coating.

Example III

A dual coating of polyhexamethylene adipamide over an orthodox enamel can be applied using the equipment of Example I. The method is the same, but two pans, one containing the enamel and the other containing an 8 per cent dispersion of polyhexamethylene adipamide, are used. Three coats of enamel and then three coats of superpolyamide are applied to #22 soft copper wire at 20 ft./min. with the oven at 315° C. A smooth coating 0.6 mil per side in thickness is obtained.

Example IV

A 0.7 mil coat of the superpolyamide obtained by interpolymerizing 34 parts of hexamethylene diammonium adipate with 66 parts of hexamethylene diammonium sebacate is applied to enameled wire in six passes through an 11.5 per cent dispersion of the superpolyamide. The wire is coated at 6 ft./min. using a 4-foot oven heated to 305° C. In an abrasion test this doubly coated wire withstands 19 strokes over a sharp edge. The enameled wire fails upon the first stroke in the same test.

Example V

No. 22 copper wire is coated with a 10 per cent aqueous dispersion of the superpolyamide obtained by polymerizing 60 parts of hexamethylene diammonium adipate with 40 parts of caprolactam. The coating is fused by passing the wire at 1.7 ft. per minute through a four-foot oven heated to 220° C. A continuous coating 0.1 mil in thickness is applied during each pass.

Example VI

A 0.7 mil coat is applied to No. 22 wire in 6 passes through a 6.5 per cent aqueous dispersion of the superpolyamide obtained by interpolymerizing 60 parts of hexamethylene diammonium adipate with 40 parts of hexamethylene diammonium sebacate. The coating is fused by passing the wire at 5–7 ft. per minute through a 4-foot oven heated to 340–345° C. Electrical breakdown between consecutive layers of this coated wire occurs at 2000 volts. The wire withstands 120 strokes over an abrasive edge upon which enameled wire fails after 18 strokes.

Example VII

A. 1.3 mil coat of polyhexamethylene sebacamide is applied to No. 22 copper wire in 11 passes, through a 7 per cent aqueous dispersion of the superpolyamide. The coating is fused during each pass at 5 ft. per minute in an oven 4 ft. long which is heated to 340° C. This coated wire is outstanding for its moisture resistance since the coating absorbs only half as much water as unmodified polyhexamethylene adipamide.

It is not intended that the invention should be limited to the examples cited. Polymers uniquely suitable for use in this invention include synthetic linear polymers or interpolymers having recurring amide linkages, particularly the hereinabove-mentioned fiber-forming superpolyamides covered in U. S. Patents 2,071,250, 2,071,253, 2,130,523, and 2,130,948. The synthetic linear polyamides are most suitable for application by this method because they melt sharply to produce fluid melts which can flow sufficiently on the wire to form continuous coats, which, on solidifying, shrinks to an extraordinarily tight fit about the core. Instead of polyamides obtained from bifunctional polyamide-forming reactants as essentially sole reactants, I may use linear superpolymers prepared by including with the polyamide-forming reactants used to prepare the polyamide other bifunctional reactants such as glycols and hydroxy acids. As examples of such modified polyamides may be mentioned those derived from diamines, dibasic acids, glycols, and those derived from amino acids and hydroxy acids. Although these products contain ester linkages, they still may be referred to as polyamides, since they contain a plurality of amide linkages and retain many of the desirable properties of simple polyamides. Like the simple polyamides, these modified polymers do not exhibit fiber-forming properties until their intrinsic viscosity is at least 0.4. Generally, the most appropriate polyamides are those possessing intrinsic viscosities in excess of 0.4, or capable of being drawn into fibers showing by characteristic X-ray patterns orientation along the fiber axis, but polyamides of even less viscosity especially those formed from three or more components, also may be employed in the practice of the invention.

Synthetic fusible polymers other than the polyamides with which the process of this invention also may be practiced, include vinyl polymers such as polyvinyl chloride, polyvinyl acetate, polyvinyl formal, polyvinyl butyral, polystyrene, and vinyl interpolymers such as those obtained by interpolymerizing two or more of the following: vinyl chloride, vinyl acetate, symmetrical dichloroethylene, unsymmetrical dichloroethylene, methyl methacrylate, methyl acrylate, acrylonitrile and styrene. Polyethers such as are obtained by reacting an aliphatic dihalide with a dihydric phenol are also useful in the practice of this invention. Cellulose esters and ethers such as cellulose acetate, cellulose acetate butyrate and ethyl cellulose may also be advantageously employed. Although the objectives of evenness and uniformity of coating generally are best served when dispersions are employed, the compounds listed in the preceding paragraph, as well as the polyamides, may, if desired, be applied to the core in other arrangements, provided, immediately prior to their fusion on the core, they are in the form of discrete particles. In any case, however, it is to be noted that the process of the invention is most valuable when those synthetic fusible polymers are employed which, like the polyamides but unlike a majority of the other materials mentioned in the said paragraph, are not soluble in ordinary organic solvents, and therefore are not eligible for ordinary processes of solution coating.

As media in which not merely the polyamides, but the synthetic fusible polymers generally, are dispersed, may be used any liquids which are volatile at the oven temperature, which do not dissolve the polymers appreciably, at least at substantially lower temperatures, and which do not substantially alter the polymers under the coating conditions. Such liquids may include water, methanol, ethanol, higher alcohols, benzyl alcohol, furfuryl alcohol, tetrahydrofurfuryl alcohol, ethylene glycol, acetone, methyl ethyl ketone, ethyl acetate, ethyl butyrate, amyl acetate, isopropyl ether, dioxane, benzene, toluene, petroleum hydrocarbons, dichlormethane, chloroform, carbon tetrachloride, dichloroethylene, trichloroethylene, tetrachloroethylene, dichloroethane, trichloroethane, tetrachloroethane, pentachloroethane, mixtures of these liquids, and solutions of other materials in these liquids. Phenol, cresol, and xylenol, for instance, may be used as diluents in conjunction with other liquids.

The dispersions used for coating wire may be modified by addition of other materials. The modifying agent may be blended with the polymer, dispersed in the dispersion medium or dissolved in the dispersion medium. Modifying agents include dispersing agents, plasticizers, waxes, resins, pigments, dyes, antioxidants, metal deactivators, and ultraviolet opacifiers. Suitable dispersing agents include proteins such as casein and soy bean proteins, polyvinyl alcohol, partially hydrolyzed polyvinyl acetate, soaps, sulfated alcohols and products known to the trade as "sapamine" and "Leukanol."

Waxes, although not always compatible with the polymers, are suitable for use as modifying agents for them. These include paraffin, carnauba, montan, beeswax, and hydrogenated castor oil. Such materials, when used in small amounts, even if not compatible with the fusible synthetic polymer, exude on the surface of the coatings and improve the resistance of the coated wire toward moisture. Pigments suitable for incorporation in the dispersions of fusible synthetic polymers include zinc oxide, clay, carbon black, lakes on inorganic substrates, azo pigments, Prussian Blue, chrome green, titanium oxides, iron oxide, Lithol Red, lithopone, zinc sulfide, iron blue, and the phthalocyanines. Mixtures of these pigments also may be used. Among the appropriate plasticizers for the synthetic linear polyamides are the sulfonamides, such as toluene sulfonamide, N-alkyl toluenesulfonamides, amylbenzenesulfonamide and N-alkyl amylbenzenesulfonamide; phenols, such as resorcinol, tertiary butyl phenol, diamyl phenol, 4-hydroxydiphenyl 2(bis-4-hydroxy-phenyl) propane; ether esters, such as di(methoxyethyl) adipate, di(methoxyethoxyethyl) adipate, di(methoxyethyl) sebacate, di(methoxyethoxyethyl) sebacate, di(methoxyethyl) phthalate, di(methoxyethoxyethyl) phthalate; esters, such as diethyl phthalate and dibutyl phthalate; and ethers, such as dimethoxytetraethylene glycol. The addition of a plasticizer usually lowers the viscosity of the melt and consequently increases the flow of the polymer upon the object.

Resins suitable for use in polyamide dispersions include polymethacrylates such as polymethyl methacrylate and poly-butyl methacrylate, phenol-formaldehyde resins, urea-formaldehyde resins, polyether resins, polyvinyl alcohol, polyvinyl acetate, partially hydrolyzed polyvinyl acetate, styrene polymers and interpolymers, neoprene, rosin, glyptals, ethylene-sulfur dioxide resins, cellulose ethers and esters, and polymeric hydrocarbons such as rubber, gutta-percha, ethylene and butylene polymers.

The ordinary equipment which is known to the wire-enamelling trade may be employed for coating wire with the dispersions. Essentially, such apparatus consists simply of a bath in which the enamel is applied, and a chamber in which the enamel is baked. As in the case of the orthodox enamel, the dispersion can be applied either with or without the use of wiping dies. The heating of the dispersion to evaporate the dispersion medium and to fuse the polymer may be by radiation, conductance, or by internally heating the wire, or by a combination of these methods. Infra-red radiation 3 microns in wavelength is particularly useful when the polyamides are used, since this is the wavelength most completely absorbed by them. The heating ordinarily is accomplished by passing the wire through an oven. It sometimes is advantageous, although not always necessary, to fill the oven with an inert gas such as nitrogen or carbon dioxide. The temperatures used in coating the wire are dependent upon the rate at which the wire passes through the oven, the length of the oven, the size and composition of the object, the melting point of the composition, and the method of heating. These temperatures may vary from 100-400° C. but temperatures of 250-350° C. are usually suitable for applying unmodified aqueous dispersions of superpolyamides such as polyhexamethylene adipamide in the usual types of equipment.

Coatings of any thickness can be built up by using the required number of passes, but the method is most useful for applying coats less than 2 mils in thickness. These coatings may be built up in 1 to 8 passes.

The dispersion coating process is particularly adapted to application of fusible synthetic polymer coatings over the usual orthodox enamel insulation, since the same equipment is used to apply both of the materials, and it can be done in a single operation. The wire is first passed the desired number of times through the orthodox enamel bath and then through the dispersion bath, until the desired coat thickness is built up. If the orthodox enamel is not baked rapidly enough at the rate at which the fusible synthetic polymer is applied the wire may be passed one or more times through the oven after application of the orthodox enamel without applying any further coating before it enters the dispersion bath.

In some instances, it is desirable to pass the dispersion-covered object rapidly through the oven several times, before applying additional layers of the dispersion. For instance, when the surface to be coated comprises organic or other material which would be injured by the heat exposure for a sufficient period to melt the polymer in a single step, it often is possible to avoid such injury by accomplishing the melting in installments, as by very short exposures to heat in intermittent sequence. The heating influence thus may be more concentrated or localized in the layer of polymer than in the substratum, as compared with cases where more opportunity is afforded for the heat to penetrate beneath the same. This procedure is especially suitable where the object coated is of unusually delicate structure.

The same procedure also may be desirable, however, where a high degree of dielectric strength is needed, and where the polymer is of a high-melting type in which minute voids result if the molten polymer is exposed to merely atmospheric pressure for substantial intervals of time, or even for only fractions of a second, in some cases. Momentary exposure to the heat, followed by very mild cooling and then re-exposure to the heat for another instant, and so forth, results in bringing the polyamide coating, throughout its thickness, up to a temperature just beneath its melting point, prior to the final exposure or exposures which occasion the actual melting. In consequence the duration of the exposure of the polymer to merely atmospheric pressure, while molten, is minimized.

It is significant that the invention may be used for the production of coatings up to 2 mils or more, in thickness, consisting of only a single lamina; whereas a plurality of strata or laminae need to be applied, and normally are found in the final coating, when the solution method is employed.

Superpolyamide-coated objects can be dyed easily, to produce colored wires useful for identification. The dyes suitable for this purpose include those of C. I. No. 365, 234, 653, 225, 176, 419, 370, 431, 583, 594, 593, 267, 833, 307, 289, and 430.

Wire coated with synthetic fusible polymers may be covered with other known wire-covering materials, such as cotton, silk, rubber and varnished cambric.

Although the electrical properties of the orthodox enamel insulation on wire are satisfactory, such insulation is very weak, mechanically. In the course of winding coils on electrical machines the wire is subjected to abrasion and flexing which tend to break the insulation. Furthermore, since the orthodox enamel coating is not extensible, it often is broken when the wire is cold drawn under the tension applied during the winding of coils. The mechanical properties of fusible synthetic polymers, especially the fiber-forming superpolyamides, make them ideally suited for wire insulation. The extreme toughness of these latter compounds makes them very resistant to abrasion. Superpolyamide-coated wire, for instance, is so tough that when it is flexed or twisted repeatedly, the wire breaks before the polyamide coating does. Furthermore, since the polyamides can be extended as much as 400 per cent, the polyamide coating is not injured by stretching. Polyamide-coated wire can even be die-drawn without breaking the coating. The use of superpolyamide-coated wire in electrical machines is of great advantage, by reason, for example, of the fact that the failure caused by damage to the wire during winding is eliminated. Furthermore, the use of superpolyamide-coated wire makes possible higher speeds in winding coils than is possible with ordinary enamel wire. Due to the extreme durability of the superpolyamide-coated wire, the coat of varnish which usually is applied to the winding to fill the cracks is unnecessary. Sometimes, however, the windings are varnished to give them increased rigidity. A great advantage of the dispersion process for coating wire over the solution-coating process is that it permits the application of extremely insoluble insulating materials such as the superpolyamides. These extremely insoluble polymers are more desirable as insulating materials for wire since they are not affected by the oils, aromatic or aliphatic hydrocarbons, or halogenated hydrocarbons with which insulated wire must frequently come in contact. This characteristic is of particular advantage in sealed refrigerator motors where the motor windings come in contact with refrigerants such as dichlorodifluoromethane, and dichlorotetrafluoroethane. The resistance to attack by hydrocarbons also is a distinct advantage, since hydrocarbon solvents usually are employed in the varnishes which are applied to the windings of motors to give them increased rigidity.

A further advantage of the dispersion coating method is that it permits the use of inexpensive liquids such as water as dispersion media, while the solution coating process requires expensive solvents which usually cannot be recovered.

Since many apparently widely different embodiments of this invention may be made without departing from the spirit and scope thereof, it is to be understood that I do not limit myself to the specific embodiments thereof except as defined in the appended claims.

I claim:

1. In the manufacture of coated wire, the process which comprises depositing on the wire a deposit of finely divided crystalline synthetic linear polymeric amide by passing the wire through a water suspension of said polymeric amide, fusing the deposit of polymeric amide and quenching the fused coating.

2. The process set forth in claim 1 in which said polymeric amide is polyhexamethylene adipamide.

3. The process of claim 1 wherein the said polymeric amide is the reaction product of a polyamide-forming composition comprising reacting materials selected from the class consisting of (a) and (b), where (a) is polymerizable monoaminomonocarboxylic acids, and (b) is mixtures of diamine and dibasic carboxylic acid, the said polymeric amide having an intrinsic viscosity of at least 0.4.

4. The process of claim 1 wherein the existence of minute voids in the final coating is avoided by effecting the said melting through a series of intermittent, externally applied heat treatments of brief duration, the respective durations of which treatments are less than the total time requisite for fully melting the said polymeric amide by one such heat treatment, and upon completion of the said melting substantially immediately chilling the said polymeric amide.

5. The process set forth in claim 1 in which said polymeric amide is polyhexamethylene sebacamide.

6. The process set forth in claim 1 in which said polymeric amide is the interpolymerization product of hexamethylenediammonium adipate and hexamethylenediammonium sebacate.

PAUL ROLLAND AUSTIN.